(12) United States Patent
Willett et al.

(10) Patent No.: US 9,952,443 B2
(45) Date of Patent: *Apr. 24, 2018

(54) PROJECTION SUBSYSTEM

(71) Applicant: 3M INNOVATIVE PROPERTIES COMPANY, St. Paul, MN (US)

(72) Inventors: Stephen J. Willett, St. Paul, MN (US); Craig R. Schardt, Woodbury, MN (US); David J. W. Aastuen, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,774

(22) Filed: Nov. 9, 2016

(65) Prior Publication Data

US 2017/0052383 A1    Feb. 23, 2017

Related U.S. Application Data

(63) Continuation of application No. 13/585,168, filed on Aug. 14, 2012, now Pat. No. 9,525,855.

(60) Provisional application No. 61/525,546, filed on Aug. 19, 2011.

(51) Int. Cl.
| | |
|---|---|
| *G02B 27/28* | (2006.01) |
| *G03B 21/20* | (2006.01) |
| *H04N 9/31* | (2006.01) |
| *G02B 5/30* | (2006.01) |
| *G02B 13/16* | (2006.01) |

(52) U.S. Cl.
CPC ......... *G02B 27/283* (2013.01); *G02B 5/3025* (2013.01); *G02B 13/16* (2013.01); *H04N 9/3167* (2013.01); *G03B 21/20* (2013.01)

(58) Field of Classification Search
CPC .... G02B 27/283; G03B 21/00; G03B 21/006; G03B 21/14; G03B 21/20
USPC .................. 353/20, 81; 359/485.01–485.07, 359/487.01–489.2, 491.01, 629–630, 634, 359/638–640
See application file for complete search history.

(56) References Cited

U.S. PATENT DOCUMENTS

| | | | |
|---|---|---|---|
| 6,088,067 | A | 7/2000 | Willett |
| 6,609,795 | B2 | 8/2003 | Weber et al. |
| 6,926,410 | B2 | 8/2005 | Weber |
| 7,362,507 | B2 | 4/2008 | Duncan |
| 7,529,024 | B1 * | 5/2009 | Chen ...................... G02B 27/28 353/20 |

(Continued)

FOREIGN PATENT DOCUMENTS

WO    WO 02/102087    12/2002

OTHER PUBLICATIONS

The Engineering ToolBox; Coefficients of Linear Thermal Expansion; Printed Mar. 7, 2017.*

(Continued)

*Primary Examiner* — William C Dowling
*Assistant Examiner* — Ryan Howard
(74) *Attorney, Agent, or Firm* — Robert S. Moshrefzadeh

(57) ABSTRACT

Projection subsystems are described. More, particularly, projection subsystems that include a light source and a polarizing beam splitter are described. The polarizing beam splitters of the presently described projection subsystems are capable of avoiding performance degradation even after exposure to large doses of incident light.

10 Claims, 4 Drawing Sheets

(56) References Cited

U.S. PATENT DOCUMENTS

| | | |
|---|---|---|
| 7,529,029 B2 | 5/2009 | Duncan |
| 7,901,083 B2 | 3/2011 | Destain |
| 2003/0016334 A1 | 1/2003 | Weber |
| 2005/0168697 A1 | 8/2005 | Bruzzone |
| 2006/0221445 A1 | 10/2006 | DiZio |
| 2007/0023941 A1 | 2/2007 | Duncan |
| 2007/0024981 A1 | 2/2007 | Duncan |
| 2009/0237616 A1 | 9/2009 | Aizaki |
| 2009/0310471 A1 | 12/2009 | Shibuya |
| 2010/0033816 A1 | 2/2010 | Dizio |
| 2011/0149547 A1 | 6/2011 | Bruzzone |
| 2011/0216396 A1 | 9/2011 | Ouderkirk |

OTHER PUBLICATIONS

U.S. Appl. No. 61/525,546 to Willett et al., filed Aug. 19, 2011, entitled *Projection Subsystem*.

International Application No. PCT/US2012/050707 Annex to Form PCT/ISA206, Communication Relating to the Results of the Partial International Search, attached to Invitation to Pay Fees dated Feb. 6, 2013.

Mitsubishi Engineering-Plastics Corporation, Thermal Properties, 20 pages.

\* cited by examiner

US 9,952,443 B2

PROJECTION SUBSYSTEM

FIELD

The present description relates to projection subsystems. More, particularly, the present description relates to projection subsystems that include a light source and a polarizing beam splitter. The polarizing beam splitters of the presently described projection subsystems are capable of avoiding performance degradation even after exposure to large doses of incident light.

BACKGROUND

A projection system typically includes a light source, one or more image forming components, or imagers, projection optics, and a screen. Often, imagers used in projection systems are typically polarization-rotating, image-forming devices, such as liquid crystal display imagers, which operate by rotating the polarization of the light to produce an image corresponding to digital video signals. Imagers used in projection systems typically rely on polarizers to separate light into a pair of orthogonal polarization states (e.g., s-polarization and p-polarization). Therefore, projection systems also will generally include a polarizing beam splitter to serve this purpose.

Recent technical advances have enabled the production of ultra-compact projection engines and systems that have relatively high light output (e.g. greater than 40 ANSI lumens). With these high levels of light output, and correlated light input levels from the light source, serious issues with the lifetime of the polarizing beam splitter, or beam splitters, within the projection system have arisen. Most notably, higher light intensity incident upon conventional polarizing beam splitters using polymeric reflective polarizers has led to degradation of the polymeric reflective polarizers at short lifetimes, and thus effective failure of the projection systems. It would be highly desirable to provide a projection subsystem that was capable of exposure to high intensity and doses of incident light while maintaining necessary performance over a longer lifetime.

SUMMARY

In one aspect, the present description relates to a projection subsystem. The projection subsystem includes a light source and a polarizing beam splitter that receives light from the light source. The light source emits light that includes blue light. The polarizing beam splitter includes a reflective polarizer upon which light from the light source is incident, a first cover placed between the reflective polarizer and the light source, and a second cover positioned on the opposite surface of the reflective polarizer from the first cover. The first and second cover both include plastic. The polarizing beam splitter exhibits a measured b* yellowness index of light that travels through it, and the b* yellowness index changes by less than 2.0 from its first exposure until after the polarizing beam splitter has been exposed to a dose of blue light of 0.3 MJ/mm². Output light is projected from the projection subsystem with an intensity of greater than 50 lumens.

In another aspect, the present description relates to a projection subsystem. The projection subsystem includes a light source and a polarizing beam splitter that receives light from the light source. The light source emits light that is at least 10% blue light. The polarizing beam splitter includes a reflective polarizer upon which light from the light source is incident, a first cover placed between the reflective polarizer and the light source, and a second cover positioned on the opposite surface of the reflective polarizer from the first cover. The first and second cover both include plastic. The polarizing beam splitter exhibits a measured b* yellowness index of light that travels through it, and the b* yellowness index changes by less than 2.0 from its first exposure until after the polarizing beam splitter has been exposed to over 8000 hours of incident light from the light source. Light projected from the projection subsystem has an intensity of greater than 50 lumens.

In yet another aspect, the present description relates to a projection subsystem. The projection subsystem includes a light source and a polarizing beam splitter that receives light from the light source. The light source emits light that is at least 10% blue light. The polarizing beam splitter includes a reflective polarizer upon which light from the light source is incident, a first cover placed between the reflective polarizer and the light source, and a second cover positioned on the opposite surface of the reflective polarizer from the first cover. The first and second cover both include plastic. The polarizing beam splitter exhibits a measured b* yellowness index of light that travels through it, and the b* yellowness index changes by less than 2.0 from its first exposure until after the polarizing beam splitter has been exposed to over 4000 hours of incident light from the light source. Light projected from the projection subsystem has an intensity of greater than 100 lumens.

In another aspect, the present description relates to a projection subsystem. The projection subsystem includes a light source and a polarizing beam splitter that receives light from the light source. The light source emits light that is at least 10% blue light. The polarizing beam splitter includes a reflective polarizer upon which light from the light source is incident, a first cover placed between the reflective polarizer and the light source, and a second cover positioned on the opposite surface of the reflective polarizer from the first cover. The first and second cover both include plastic. The polarizing beam splitter exhibits a measured b* yellowness index of light that travels through it, and the b* yellowness index is less than 3.0 after exposure to over 8000 hours of incident light from the light source. Blue light is incident upon the reflective polarizer with an intensity of greater than 6 mW/mm².

DETAILED DESCRIPTION

Figure 1:
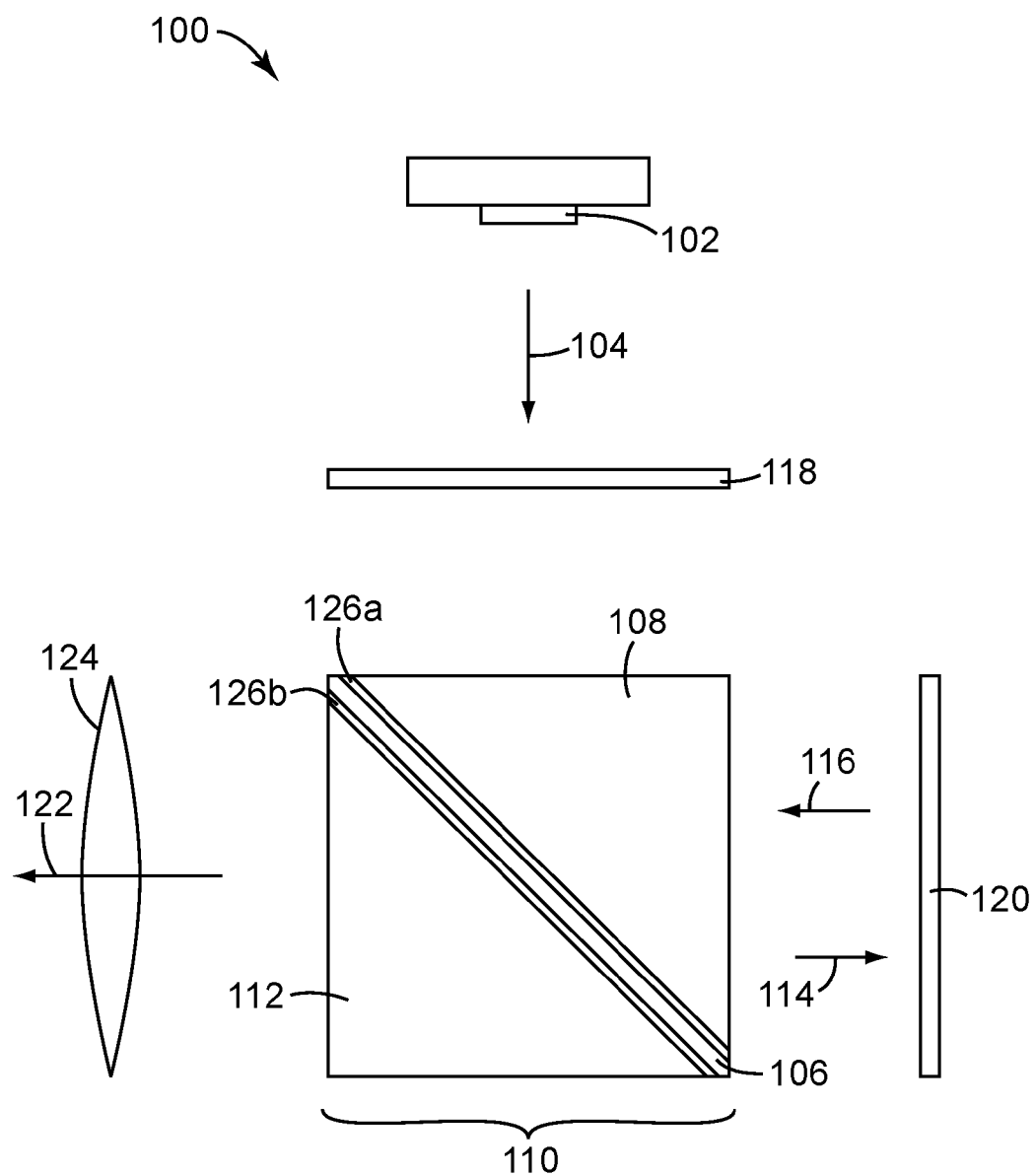
FIG. 1 schematically illustrates an embodiment of a projection subsystem according to the present description.

The present description aims to provide for a projection system or subsystem in which light with a higher intensity enters into, and is emitted from, the system. In such a case, micro-projection systems based on polymeric reflective polarizers suffer from failure of the system after a short amount of use. This may be in part due to the failure of polarizing beam splitters within such systems. The present description aims to solve this problem by providing a projection subsystem that is capable of exposure to high intensity and doses of incident light while maintaining necessary performance over a longer lifetime.

In order to produce images having a wide range of colors, a projector will typically use a light source that is capable of producing light of at least three distinct colors. These colors are known as the primary colors and typically are generally categorized as red, green, and blue. A light source will typically be configured to supply the projection system with a ratio of these three colors such that the resultant color of the light will appear white to a typical observer. Images that are not pure white are then formed by using an image forming device to selectively control how much light of each color is transmitted to the screen from each pixel of the image.

A given amount of light energy will produce a certain visual response in an observer. There are well-known relationships between the energy (expressed, for example, in units of Watts) and the visual response (expressed, for example, in units of lumens). Producing a white image of a desired number of lumens will require a certain amount of energy of red, green, and blue light from the source. The energy required from the source will depend on the efficiency of the optical system as well as the spectral distribution of each of the primaries and the desired color of the white point. For example, if the optical system has an efficiency of 20%, then the source must emit 5 times as much light as the observer will see on the screen (for a 100 lumen white image, the source will have to produce about 500 lumens). Using some general values for red, green, and blue LEDs, the amount of light from each primary can be estimated to make up a desired white light. For the example of a 500 lumen white source with a white point of D65 (as defined by the CIE standards) the light might consist of roughly 133 lumens from the red primary, 340 lumens from the green primary, and 27 lumens from the blue primary. This white light may therefore be stated as a ratio of primary colors measured "photometrically," in other words, in terms of the luminance of each color. For this example, the 500 lumen white source is 26.5% red, 68.1% green, and 5.4% blue. In another sense, the white light output may be analyzed and measured in terms of the energy of the light (radiometrically). For this same case, the total light power output is about 1.9W, of which 0.76 W are red, 0.65 W are green, and 0.49 W are blue. Thus, a radiometric measurement of this 500 lumen white light source yields a radiometric ratio of red, green and blue of 40.1% red, 33.9% green, and 25.9% blue. This is provided only as an example and must be determined for any optical system based on the various factors already mentioned. Throughout the claims and specification, light sources may be defined both in terms of photometric and radiometric measurements. Thus, a white light source may be described as a 500 lumen light source (a photometric measurement), but may also be described as containing 25.9% blue light in terms of energy. Throughout the specification, intensity or brightness of light sources will generally be described by photometric measurement (i.e. lumens). However, when there is an attempt to define the amount or ratio of blue light within the entirety of the output light (e.g. light made up of 10% blue light), this ratio or amount will generally be described or calculated in terms of energy (i.e. Watts).

When light interacts with a material, such as a polymeric reflective polarizer, it can cause damage that degrades the performance of the material. Experiments have shown that blue light causes the most damage in polymeric reflective polarizers and that the rate of damage caused by the blue light depends on the energy density of blue light incident on the polymeric reflective polarizer. The energy density may be expressed in units of, for example, $W/m^2$ or $mW/mm^2$. Continuing with the 500 lumen source example, if the light from this source is incident on a polarizing beam splitter in the shape of a cube with sides of 1 cm and with the film mounted so that it is at 45° relative to the light beam, then the blue light irradiance on the reflective polarizer would be at least 3.5 $mW/mm^2$ on the film. In real projection systems, the light is rarely this uniformly distributed and the irradiance on some areas of the reflective polarizer would be significantly higher than this average estimate.

FIG. 1 illustrates a projection subsystem 100 according to the present description. Projection subsystem 100 includes a light source 102. The light source 102 may be any number of appropriate light sources commonly used in projection systems. For example, the light source 102 may be a solid-state emitter such as a laser or light emitting diode (LED) emitting light of a specific color such as red, green, or blue light. The light source 102 may also include a phosphor or other light converting material that absorbs light from the emissive source and re-emits light at other (generally longer) wavelengths. Suitable phosphors include well known inorganic phosphors such as Ce-doped YAG, strontium thiogallate, and doped silicate and SiAlON-type materials. Other light converting materials include III-V and II-VI semiconductors, quantum dots, and organic fluorescent dyes. Alternatively, the light source may be made up of a plurality of light sources, such as a red, a green and a blue LED, where such LEDs may be activated together or sequentially. Light source 102 may also be a laser light source, or potentially a traditional UHP lamp.

Light 104 is emitted from the light source and travels towards polarizing beam splitter 110. Optical elements commonly used in projection systems may be placed between the light source 102 and polarizing beam splitter 110. Such elements may include, for example, a collimator, as described in commonly owned and assigned U.S. Pat. No. 7,901,083, incorporated herein by reference. The light source of the present description may generally be understood to emit light at a very high intensity and luminous flux. For example, light 104 emitted from the light source 102 that is incident upon polarizing beam splitter 110 may have an luminous flux of greater than 150 lumens, or greater than 200 lumens, or greater than 300 lumens, or greater than 400 lumens, or greater than 500 lumens, and potentially even greater than 750 lumens or 1000 lumens. As described earlier, typical projection systems or subsystems often times have an optical efficiency of between about 15 to 25%. As such light 122 that is ultimately emitted or projected from the projection may generally be of a brightness and intensity of greater than 50 lumens, and potentially greater than 60 lumens, greater than 70 lumens, greater than 80 lumens, greater than 90 lumens, greater than 100 lumens, or even greater than 110 lumens. A good portion of the light that is emitted from light source 102 will be "blue light." For purposes of this description, and likely as understood in the art generally, blue light may be understood as light with a wavelength of between about 430 nm and about 490 nm. Light that is emitted from light source 102 and incident upon polarizing beam splitter 110 may contain at least 5% blue light, or at least 10% blue light, or at least 15% blue light (where again blue light is light having a wavelength of between about 430 nm and about 490 nm).

Polarizing beam splitter is made up in part of a reflective polarizer 106. Reflective polarizer 106 is surrounded by a first cover 108 and a second cover 112. First cover 108 is positioned between the reflective polarizer 106 and the light source 102. Second cover 112 is positioned on the opposite surface of the reflective polarizer 106 from the first cover 108 (and therefore also opposite the reflective polarizer from light source 102). Reflective polarizer 106 may be made up of any number of suitable reflective polarizers. For example, the reflective polarizer 106 may be a multilayer optical film, such as that described in commonly owned U.S. patent application Ser. No. 6,486,997, which is hereby incorporated by reference in its entirety. In at least some embodiments, the reflective polarizer 106 may be made of PEN, and potentially be of a multilayer formation with alternating layers of PEN and coPEN. The reflective polarizer may also be made of other suitable resins used to create a birefringent multilayer film, such as PET, for example.

First cover 108 and second cover 112 surround reflective polarizer 106. Very often in the prior art, covers of a polarizing beam splitter are composed of glass. However, in the current description, it is an object of the invention to better match the properties of the covers (108, 112) with those of the film 106. Specifically, it is desired that the coefficient of thermal expansion of the first cover 108 and/or the second cover 112 be substantially matched to the machine direction (i.e., the direction transverse to the stretched direction of the film) coefficient of thermal expansion of the reflective polarizer 106. For example, the first and second cover may each have a coefficient of thermal expansion that is between about 60 ppm/K and about 120 ppm/K. This may generally be within about 40 ppm/K of the coefficient of thermal expansion in the highest axial direction of the reflective polarizer. In at least some embodiments, rather than glass, the first cover 108 and/or second cover 112 may be made up in part of a non-glass material. For example, the first cover 108 and/or second cover 112 may be made of a plastic material. Appropriate materials for the first and second covers may include polymethyl methacrylate (PMMA) or cyclic olefins (CO) or copolymers of PMMA or CO and those discussed in commonly owned U.S. Pat. No. 7,529,029, column 16, lines 44-54. This section of U.S. Pat. No. 7,529,029 is hereby incorporated by reference.

First cover 108 and second cover 112 may be fixed to reflective polarizer by any number of appropriate means. For example, first cover 108 and second cover 112 may be secured to reflective polarizer 106 by adhesive layers 126a and 126b, respectively. In a number of embodiments, the adhesive will be substantially matched in index of refraction to the reflective polarizer 106, first cover 108, second cover 112, or all three, such that light is separated by polarization at polarizer 106 rather than by reflection at the interface with adhesive 126a, 126b. The properties of the adhesive 126a, 126b should also be chosen such that there is minimal disruption to the matching in coefficient of thermal expansion of the covers and reflective polarizer, and accompanying benefits thereof. Adhesive layer 126a, 126 may in some embodiments be pressure-sensitive adhesives. In other embodiments, adhesive layer 126a, 126b may be photocurable adhesives or thermally-cured adhesives or two-part adhesives.

The projection subsystem, or larger system of which the projection subsystem is a part, may in many embodiments include an imager 120. In the embodiment illustrated in FIG. 1, the imager 120 is a reflective imager. One appropriate imager is a liquid crystal on silicon (LCoS) imager. Light 104 that is incident upon reflective polarizer 106 reflects light of a certain polarization (i.e. either s-polarized or p-polarized light) towards imager 120 and transmits light of the opposite polarization. Thus in certain embodiments, the imager 120 may be placed such that the polarization that transmits through the polarizer 106 is incident upon the imager 120. In this embodiment, the polarized unimaged light 114 that is reflected is incident upon imager 120. The light is imaged and redirected as imaged light 116 back towards the polarizing beam splitter 110.

In order to improve the contrast ratio of the projected image a pre-polarizer 118 may also be placed between the light source 102 and reflective polarizer 106 before the light is separated at reflective polarizer 106. The pre-polarizer may generally relate to previously described pre-polarizers such as the pre-polarizers described in commonly owned and assigned U.S. Pat. No. 6,088,067, incorporated herein by reference.

Of course, in any construction in which light is projected, the color of light may be of at least some importance. However, where the light is being imaged and projected, the ability to control the color of light is of paramount importance. Unfortunately, polymeric reflective polarizers used in polarizing beam splitters within projection systems degrade after a given amount of time. This degradation becomes far more rapid with higher intensity light sources, such that where two films have been exposed to equivalent doses of light ($MJ/mm^2$), the film that has been exposed to these doses at higher intensity will degrade far more quickly. This degradation may generally cause a "yellowing" of the light that travels through or is reflected off of the reflective polarizer 106. In order to quantify the amount of "yellowing" and thus degradation that occurs with a given film or polarizing beam splitter, one may measure the transmission or reflection of light by the film and then calculate the color of the transmitted light in the well-known CIE L*a*b* color space. Some instruments can do this measurement directly. The b* value is a general indication of yellowness, with higher positive values representing increased yellowness. In this application, we refer to the "b* yellowness index" in order to make clear that we are using this method as a gauge of the yellowness of the light that travels through the film.

Generally, the polarizing beam splitter 110 of the present description will display a low b* yellowness index value for exiting light. For example, the b* yellowness index value of light traveling through the beam splitter at first use may be less than 1.0 or less than 1.5 or less than 2.0 or less than 2.5. The initial value of b* yellowness, however, does not in any way speak to the lifetime of the beam splitter. This is because, once again, the b* yellowness of light traveling through polarizing beam splitters will rise upon further exposure to incident light 104. A typical level of b* yellowness of light that may be considered "failure" for purposes of a projection system is likely more than 4.0. Many prior art projection systems, when exposed to light sources emitting light of a brightness of 250 lumens or especially 500 lumens, and providing an energy density of blue light of greater than 5 $mW/mm^2$ may reach unacceptable b* yellowness index values at short amounts of time.

However, in the current description, where the light source 102 has a brightness of, e.g. 150 to 400 lumens, and the projection subsystem emits or projects light of greater than 50 lumens, the b* yellowness index will change by less than 2.0 after 8,000 hours of use. The b* yellowness index value of light after 8,000 hours of use may generally be 3.0 or less. Further, in the current description, where the light source 102 has a brightness of emitted light of, e.g. 300 to 1000 lumens and the projection subsystem 100 emits or projects light of greater than 100 lumens, the b* yellowness index of light emitted from the beam splitter will change by less than 2.0 after 4,000 hours of use.

Where the b* yellowness index value of light after 8,000 hours of use may generally be 3.0 or less and/or may change by less than 2.0 after 8,000 hours of use, the light may also be incident upon the reflective polarizer of the PBS with a high intensity. Particularly the blue light (as defined herein) may be incident upon the reflective polarizer with an intensity of greater than 6 mW/mm$^2$ or greater than 8 mW/mm$^2$ or greater than 10 mW/mm$^2$.

A corollary measure to that of brightness and intensity of the light that is incident upon a polarizing beam splitter, and the brightness and intensity of light that is projected from the projection subsystem 100 (e.g. 122, 222) is the "dose" of incident light that the polarizing beam splitter receives. The dose of light incident on any portion of a film may be estimated by multiplying the irradiance on that portion of film by the duration of that exposure. More specifically, one may measure the dose of "blue" light that the polarizing beam splitter receives (where blue light is defined as above). The light incident on any portion of the film may arrive from different directions. For example, a region of the film may be exposed to light from the illuminator and also reflected light from the imager. All of the incident light must be summed when calculating the dose of incident light. Where the projection subsystem emits light at an intensity of greater than 50 lumens, and the polarizing beam splitter 110 has been exposed to a dose of 0.3 MJ/mm$^2$, then the b* yellowness index of light emitted from the beam splitter will change by less than 2.0. The b* yellowness index of light emitted from the beam splitter may also change by less than 2.0 after doses of 0.35 MJ/mm$^2$ or even 0.40 MJ/mm$^2$ where the projected light 122 intensity is 50 lumens.

Once imaged light 116 returns to polarizing beam splitter 110 it travels through first cover 108, reflective polarizing film 106 (as some of the imaged light may be of the "pass" polarization state), and through second cover 112. Projected light 122 then leaves polarization beam splitter 110 where it encounters projection lens 124 en route to being projected to the display, such as a viewing screen. While only illustrated with a single element projection lens 124, subsystem 100 may include additional imaging optics as needed. For example, the projection lens 124 may in fact be a plurality of lenses, such as lens group 250 of commonly owned and assigned U.S. Pat. No. 7,901,083.

As discussed above, the intensity of light incident upon polarizing beam splitter 110 will generally be quite high, making longer lifetimes difficult without performance issues. It should also be understood that light 122 leaving polarizing beam splitter will also be of great intensity. For example, projected light 122 leaving subsystem 100 may generally be greater than 40 lumens, or greater than 50 lumens, or greater than 60 lumens, or greater than 70 lumens, or greater than 80 lumens, or greater than 90 lumens, or potentially even greater than 100 lumens or 110 lumens.

Figure 2:
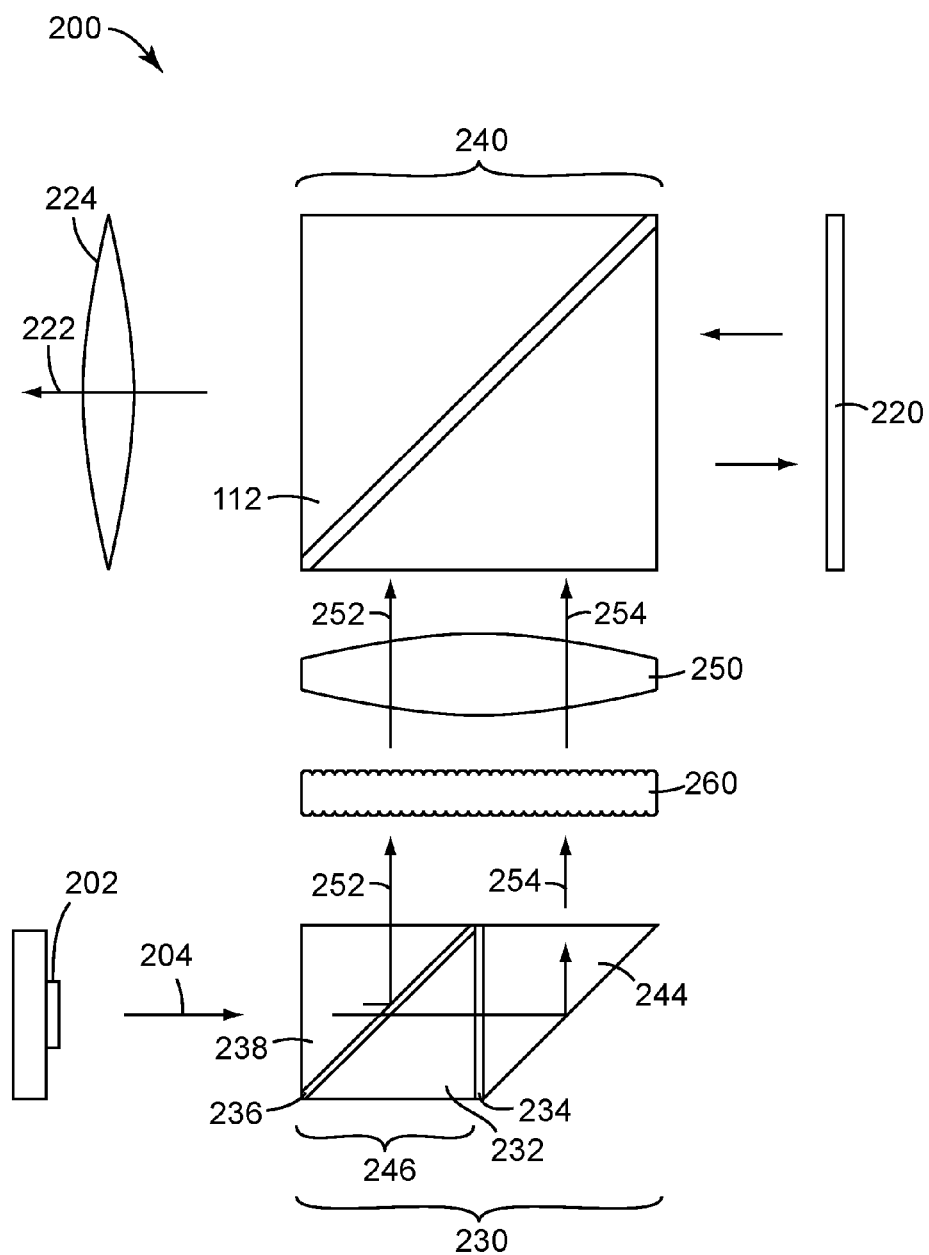
FIG. 2 schematically illustrates an embodiment of a projection subsystem according to the present description.

In a number of embodiments of the projection subsystem described herein, the polarizing beam splitter will be part of a polarization conversion system. FIG. 2 schematically illustrates another embodiment of a projection subsystem 200 that includes polarization conversion system 230.

In this embodiment of a projection subsystem 200, light 204 is once again emitted from a light source 202. Light will be emitted from the light source at greater than 150 lumens, or greater than 200 lumens, or greater than 300 lumens, or greater than 400 lumens, or greater than 500 lumens, and potentially even greater than 750 lumens or 1000 lumens. As described earlier, typical projection systems or subsystems often times have an optical efficiency of between about 15 to 25%. As such light 122 or 222 output or projected from a projection subsystem may generally be of a brightness of greater than 50 lumens, and potentially greater than 60 lumens, greater than 70 lumens, greater than 80 lumens, greater than 90 lumens, greater than 100 lumens, or even greater than 110 lumens.

Before reaching the polarizing beam splitter 240 that will direct the light towards an imager 220, light 204 first travels through a polarization conversion system 230. Polarization conversion system is made up in part of a polarizing beam splitter 246. As with polarizing beam splitter 110 of FIG. 1, polarizing beam splitter 246 is made up of a first cover 238 upon which light is first incident, a second cover 232 opposite the first cover 238 from the light source, and a reflective polarizer 236 positioned between the first cover 238 and second cover 232. Reflective polarizer 236 may generally be understood to be a film similar to film 106 described in FIG. 1, e.g., in one embodiment, it may be a multilayer optical film made of an appropriate polymer, such as PEN. First cover 238 and second cover 232 may generally correspond in material to first cover 108 and second cover 112 of FIG. 1. For example, the covers may be made of an appropriate plastic, such as PMMA or CO.

Once light 204 is incident upon polarization beam splitter 246 of polarization conversion system 230, light 252 of one polarization (e.g. s or p-polarized light) is reflected and travels towards second polarizing beam splitter 240. Before arriving at second polarizing beam splitter 240, light may first pass through a fly-eye array 260 and a relay lens 250. The fly-eye array 260 and relay lens 250 serve to improve the uniformity of light traveling towards PBS 240, insure that the light fully illuminates the imager 220, and improve the overall efficiency of the subsystem 200. Other choices could be made to accomplish the goals of homogenizing and relaying the light, including integrating tunnels or solid rods.

Light of the opposite polarization from light 252 travels through reflective polarizer 236, and second cover 232 and passes through a half-wave film 234. Half-wave film 234 rotates the polarization of light 254 such that it matches that of light 252. It may then be reflected from the diagonal face of prism 244 in polarization conversion system 230 and also directed through fly-eye array 260 and relay lens 250 towards polarizing beam splitter 240.

This pre-polarization and polarization rotation by polarization conversion system 230 allows nearly all of the light to be reflected towards imager 220 by polarizing beam splitter 240 and ultimately projected through projection lens 224. Polarizing beam splitter 240 should be understood to operate in the same manner as polarizing beam splitter 110 of FIG. 1.

Although a greater number of elements are present in the embodiment illustrated in FIG. 2, and therefore some inherent losses may be present, the presence of fly-eye array and relay lens system, as well as the presence of the polarization conversion system 230 provide a great deal of efficiency in the system. As a result the output light 222 that is projected from the system by means of projection lens 224 will again be of high intensity. For example, light 222 output from projection subsystem 200 may be of greater intensity than 40 lumens, or greater than 50 lumens, or greater than 60 lumens, or greater than 70 lumens, or greater than 80 lumens, or greater than 90 lumens, or potentially even greater than 100 lumens or 110 lumens.

As a part of the embodiments shown in FIGS. 1 and 2, or potentially in a separate embodiment, the polarizing beam splitter may be part of a color combiner. This is illustrated by color combiner 380 in FIG. 3. In this embodiment, rather than a commonly placed white light source, or collection of sources creating white light, three separate light sources are placed on different sides of polarizing beam splitter 310. These include a blue light source 302B, green light source 302G, and red light source 302R. From each of the three blue, green and red channels, light emitted from each of the three light sources travels first through a dichroic mirror (360a, 360b, 360c) and next through a quarter wave film 370, rotating the polarization of the light 304a, 304b and 304c before it is incident upon polarizing beam splitter 310 and the reflective polarizer 306 within. Ultimately, light 322 projected from the color combiner through projection lens 324 will share the attributes of emitted light 122 and 222 described above. A complete description and better understanding of color combiners and the components described therein may be found in commonly owned and assigned U.S. Patent Application Publication No. 2011/0149547 and commonly owned and assigned U.S. patent application Ser. No. 13/129,152, each of which is hereby incorporated by reference in its entirety.

Figure 3:
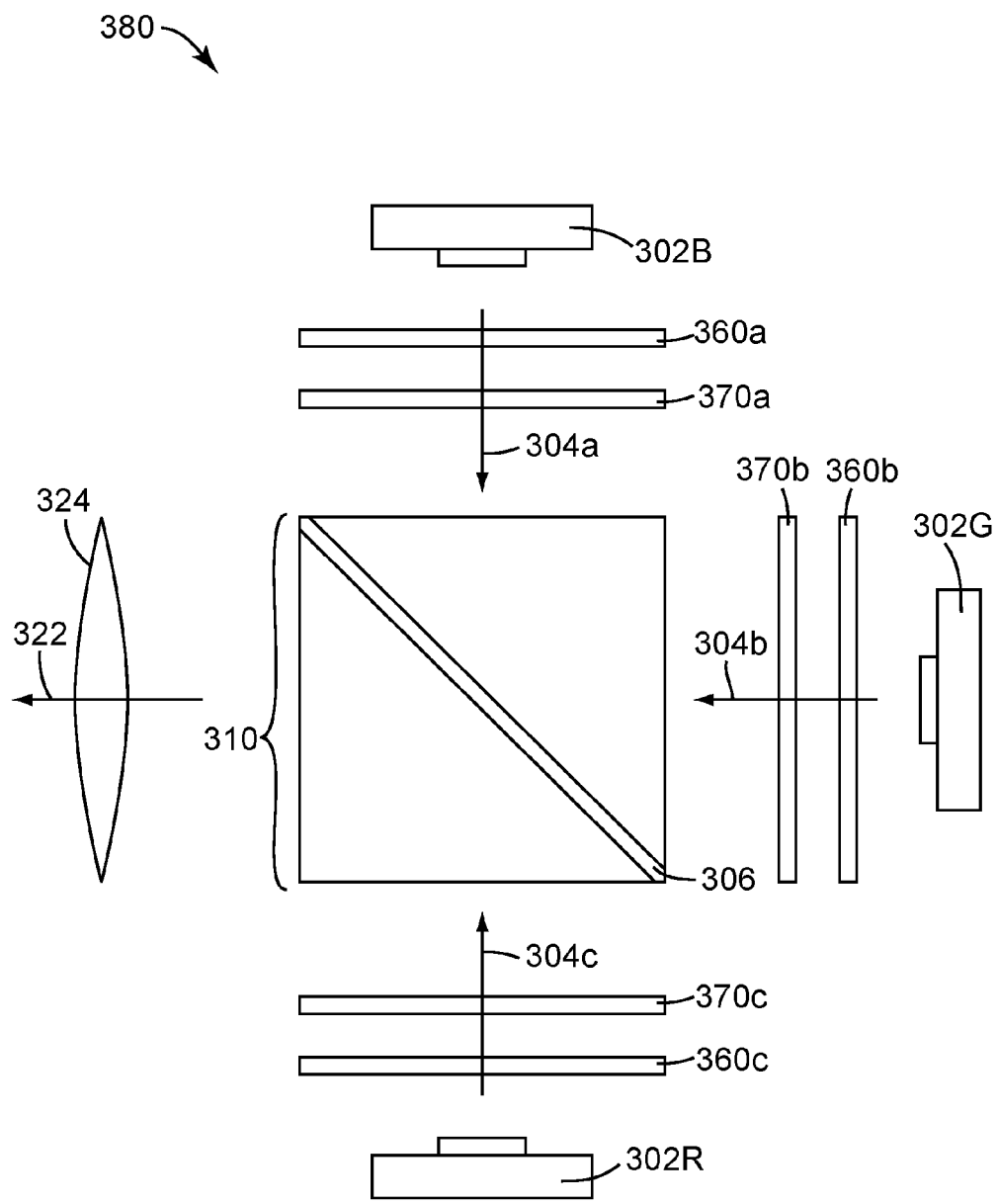
FIG. 3 schematically illustrates a polarizing beam splitter that is part of a color combiner.

It should further be understood that a number of optical elements beyond those illustrated in the embodiments of FIGS. 1, 2 and 3 may be present to properly manipulate light and guide it through the projection system as desired.

EXAMPLES

Example 1

Test samples were prepared from PEN multilayer reflective polarizer films. A number of such polarizer films were adhered between two pieces of either 1 mm thick fused silica (glass), 1 mm thick float glass, or 3 mm thick PMMA plastic plate. Each sample was adhered between the covers using NOA-76 adhesive (available from Norland Products, Cranbury, N.J., USA). The adhesive was photocured by passing the assembled samples under a fusion UV-curing lamp once on each side. Fifteen samples, five of each construction (silica cover, float glass cover, or PMMA plastic cover) were irradiated using unpolarized light from an Ultra-High Pressure (UHP) Hg lamp, where light from the lamp was homogenized using an integrating tunnel and filtered to the blue portion of the visible spectrum in wavelength (430 nm to 490 nm). Light exiting the tunnel was focused on the samples and the irradiance on the samples was set, via the filters and a mechanical aperture, to approximately 23 mW/mm$^2$. Because the output of the UHP lamps can vary over time, the irradiance was measured and recorded on a weekly basis.

The samples were located in an enclosed chamber and the air inside the chamber was heated to maintain the sample surface temperature at approximately 55° C. The samples were regularly removed from the chamber to monitor them for any change in the color of transmitted light. The color was monitored visually using a spectrophotometer. Spectral transmission data was collected using light polarized along the pass direction of the reflective polarizer film. The spectral transmission was converted to CIE L*a*b* color space. The sample was run until the b* value exceeded approximately 3.0, at which point it was considered failed. The dose of light leading to failure was estimated by integrating the sample irradiance over the time from the start of the test, until the sample was observed to have failed.

Figure 4:
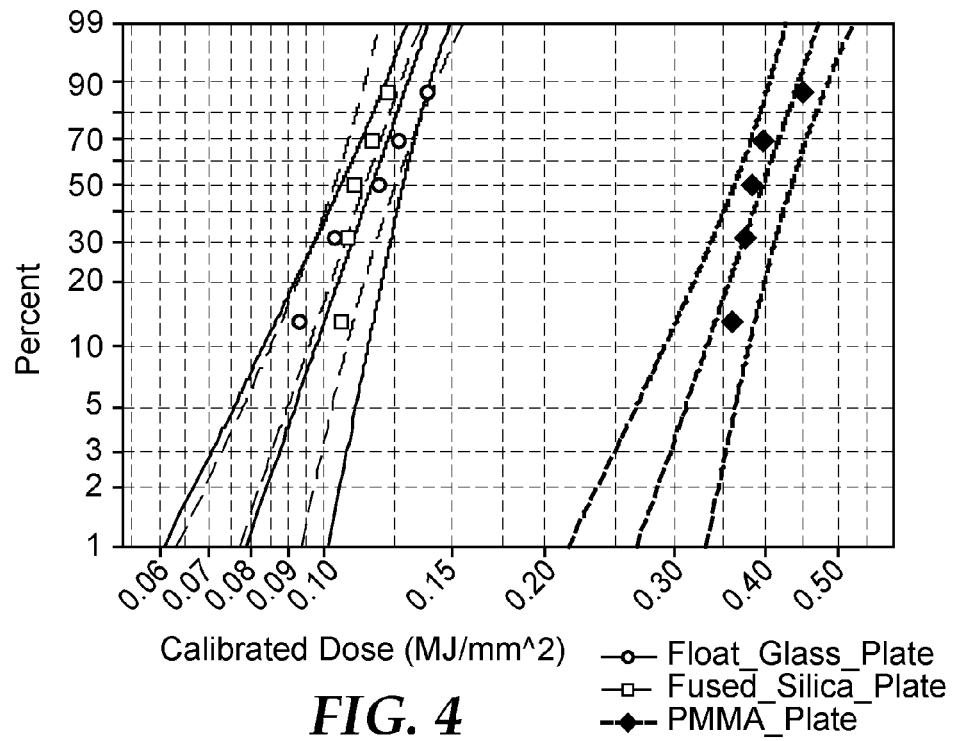
FIG. 4 is a Probability Plot for Calibrated Dose of different polarizing beam splitter samples.

Results from the three sample types are illustrated in the graph of FIG. 4. This graph provides the failure dose of all 15 samples on a Weibull plot. The graph also depicts the results of statistical analysis of the data, assuming that the failure of the samples follows a Weibull distribution and that the shape of the distribution is the same, regardless of the plate material used. As is apparent from the graph, the failure distributions of the samples that had covers of float glass and fused silica plates were nearly identical, with no statistically significant difference between them. However, the failure of samples of the PEN multilayer optical film positioned between the PMMA plastic covers occurred at a much greater dose and the difference was statistically significant. Numerical results for the estimated Mean Dose to Failure (MDTF) are provided in Table 1 below.

TABLE 1

Summary of Mean Dose to Failure for Three Samples

| Sample (Cover) | Mean Dose to Failure (MJ/mm$^2$) | Relative Lifetime |
|---|---|---|
| Fused Glass | 0.115 | 1.0 |
| Fused Silica | 0.113 | 1.0 |
| PMMA Plate | 0.392 | 3.4 |

As shown above, the PEN multilayer optical film encased in PMMA plastic withstood 3.4 times greater exposure to blue light before degrading to the point of failure. This translated directly to a 3.4 time increase in the lifetime of a projector, all other things being equal.

Figure 5:
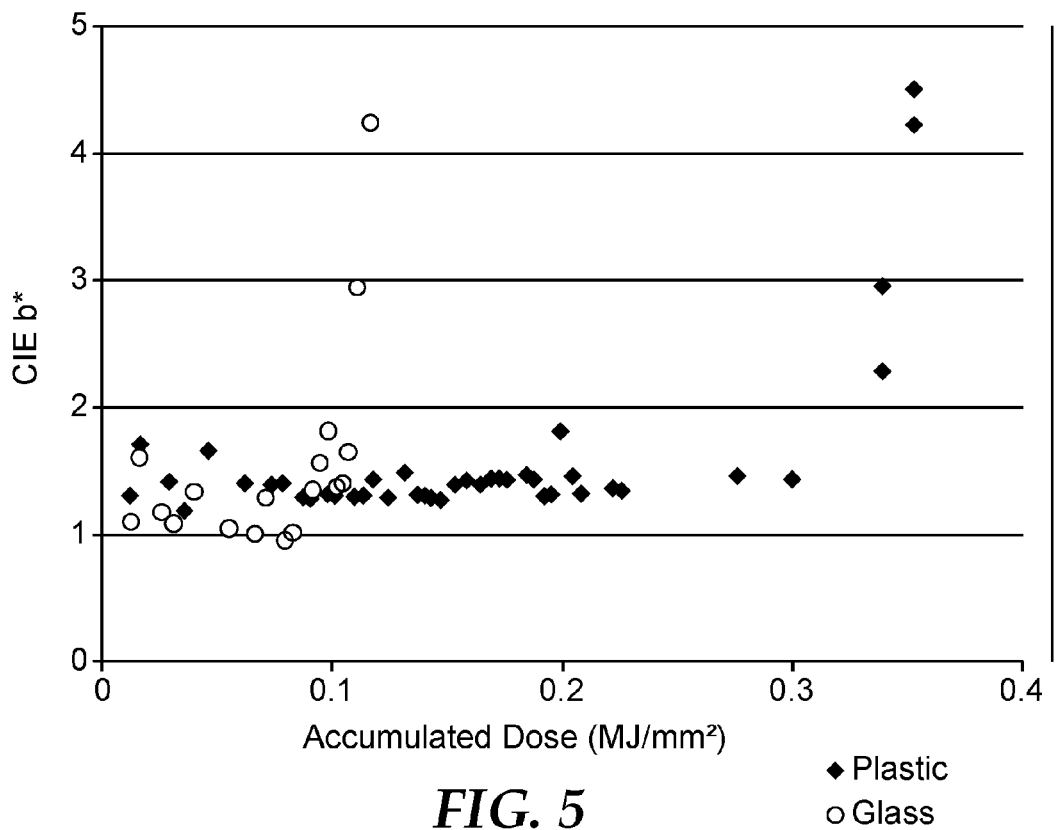
FIG. 5 is a graph of b* yellowness versus dose of incident light for two polarizing beam splitter samples.

To further illustrate the benefits of the PMMA covered polarizing beam splitter as opposed to the glass covered splitter, one sample of the fused glass was tested versus one sample of the PMMA for b* yellowness over a given dosage and mapped. The results are illustrated in the example shown in FIG. 5. As is clear from FIG. 5, while the degradation process is similar between the two samples, the b* yellowness of the PMMA covered polarizer did not reach a yellowing failure (greater than 3.0) until a much higher dosage (e.g. for this sample approximately 0.36 MJ/mm$^2$ vs. 0.11 MJ/mm$^2$).

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims.

The invention claimed is:

1. A polarizing beam splitter (PBS) comprising a multilayer reflective polarizer disposed between and adhering to first and second plastic covers, at least one of the first and second covers comprising a coefficient of thermal expansion that is within 40 ppm/K of a coefficient of thermal expansion of a machine direction of the reflective polarizer.

2. The PBS of claim 1, wherein the reflective polarizer comprises PEN.

3. The PBS of claim 1, wherein at least one of the first and second plastic covers comprises PMMA.

4. The PBS of claim 1, wherein each of the first and second plastic covers comprises PMMA.

5. The PBS of claim 1, wherein each of the first and second plastic covers comprises a coefficient of thermal expansion that is within 40 ppm/K of the coefficient of thermal expansion of the machine direction of the reflective polarizer.

6. The PBS of claim 1, wherein each of the first and second plastic covers has a coefficient of thermal expansion of between about 60 ppm/K and about 120 ppm/K.

7. A polarization conversion system comprising a right angle plastic cover disposed between and adhered to a multilayer reflective polarizer and a polarization rotator, wherein the right angle plastic cover comprises a coefficient of thermal expansion that is within 40 ppm/K of a coefficient of thermal expansion of a machine direction of the reflective polarizer.

8. The polarization conversion system of claim 7, wherein the reflective polarizer comprises PEN.

9. The polarization conversion system of claim 7, wherein the right angle plastic cover comprises PMMA.

10. The polarization conversion system of claim 7, wherein the polarization rotator comprises a half-wave film.

\* \* \* \* \*